Patented July 17, 1923.

1,462,003

UNITED STATES PATENT OFFICE.

WARREN F. BLEECKER, OF BOULDER, COLORADO.

IMPERVIOUS MATERIAL AND PROCESS FOR ITS PRODUCTION.

No Drawing.   Application filed March 3, 1922.   Serial No. 540,899.

*To all whom it may concern:*

Be it known that I, WARREN F. BLEECKER, a citizen of the United States, residing at Boulder, in the county of Boulder and State of Colorado, have invented certain new and useful Improvements in Impervious Materials and Processes for their Production, of which the following is a specification.

This invention relates to the production of an impervious material and its primary object is to provide a non-metallic material suitable for making conduits, vessels, containers, valves, and other articles used in laboratories and factories, which are impervious to liquids and gases.

Another object of the invention is to provide an impervious material of the character above referred to, which is proof against the corrosive action of acids and other chemicals, and still another object is to produce a material possessing the hereinbefore described characteristics, the basic constituent of which consists of artificial graphite.

With the above and other objects in view, my invention consists in coating artificial graphite or articles composed thereof with a substance which closes and partially fills the voids thereof and which itself is impervious to liquids and gases and substantially acid-proof.

Preferable among the materials suited for this purpose, are carbonaceous or hydrocarbonaceous substances which are capable of solidification by the evaporation of their volatile constituents, and from among these substances, I prefer the use of bituminous matter, such as pitch.

The coating material is applied to the graphite article in a fluid condition by either spraying or smearing or by immersing the article in the material, and the fluid condition of the material is obtained either by heating it beyond the melting point or by heating the article prior to or during its application to a corresponding temperature.

The manner of application should be such as to permit of the bituminous substance entering the pores and voids of the graphite by capillarity to a depth in excess of the thickness of the coating itself, so that after the coating is worn away in the use of the article or has been removed in finishing the surface of the same, the article will still remain impervious and proof against the corrosive influence of acids and other chemicals.

In the use of carbonaceous materials, the article after having been coated, is baked at a low temperature for the dehydration of the coating by evaporation of its volatile constituents. As a result of its exposal to the heat in the baking action, the coating is transformed into a film and filling of solid impervious and acid-proof matter which is fixed in the crevices, pores and voids of the artificial graphite so as to form a permanent part thereof.

The process of coating and baking the material may be repeated as often as is necessary to produce a desired finish, thickness or degree of chemical resistant quality of the article, and it will be apparent that the coating may be applied either to the entire surface of the article or only to those zones with which in practice, the corrosive liquids or gases come in contact.

Among the hydrocarbonaceous materials other than the pitch hereinbefore referred to, which are suitable for use in the production of the impervious material, are linseed oil, cottonseed oil or other similar oils, and rubber in an appropriate solvent, the material being in each case applied in a liquid condition to the surface of the article as before, after which the article is exposed to the influence of heat whereby volatile constituents of its coating are evaporated, leaving the solid hydrocarbons in the pores and voids of the graphite.

The heat is preferably applied at a low temperature and during an extended period of time and while the usual baking process is best adapted for this purpose, other means may be employed to effect the solidification of the hydrocarbons within the scope of my invention.

What I claim and desire to secure by Letters Patent is:

1. The process of rendering artificial graphite impervious, consisting in the solidification of a hydrocarbonaceous substance entered into the voids thereof.

2. The process of rendering artificial graphite impervious, consisting in coating its surface with a hydrocarbonaceous substance, and removing the volatile constituents thereof by evaporation.

3. The process of rendering artificial graphite impervious, consisting in coating its surface with a hydrocarbonaceous substance, and solidifying the same by the application of heat.

4. The process of rendering artificial graphite impervious, consisting in coating its surface with a hydrocarbonaceous substance, and baking the coated graphite.

5. The process of rendering artificial graphite impervious, consisting in coating its surface with an acid-proof substance, and removing the volatile constituents thereof by evaporation.

6. The process of rendering artificial graphite impervious, consisting in coating its surface with a carbonaceous substance, and removing the volatile constituents thereof by evaporation.

7. The process of rendering artificial graphite impervious, consisting in coating its surface with pitch, and subjecting the coated graphite to the influence of heat.

8. A new article of manufacture, consisting of artificial graphite, the voids of which are closed at the surface, by solid hydrocarbonaceous matter.

9. A new article of manufacture, consisting of artificial graphite, the voids of which are closed at the surface, by solid carbonaceous matter.

10. A new article of manufacture, consisting of artificial graphite, the voids of which are closed at the surface, by solid acid proof matter.

11. A new article of manufacture consisting of artificial graphite, a surface of which is coated with a solidified hydrocarbonaceous substance.

12. A new article of manufacture consisting of artificial graphite, a surface of which is coated with a solidified carbonaceous substance.

In testimony whereof I have affixed my signature.

WARREN F. BLEECKER.